Sept. 1, 1953 R. A. GAISER ET AL 2,650,976
ELECTRICALLY CONDUCTING LAMINATED GLASS
Filed March 21, 1951 5 Sheets-Sheet 1
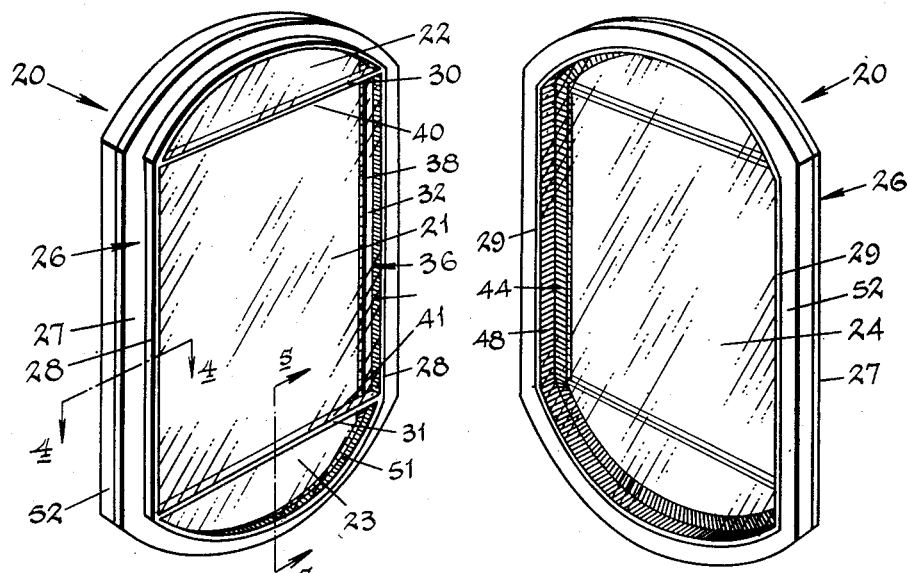
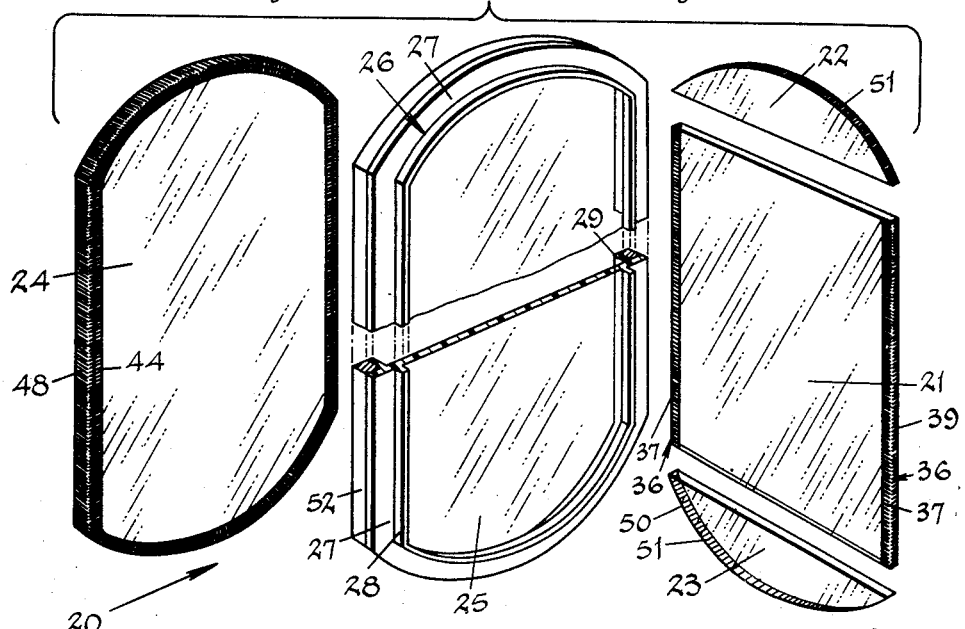
Fig. 1  Fig. 2  Fig. 3
Inventors
Romey A. Gaiser
and James H. Boicey
By Nobbe & Swope
Attorneys

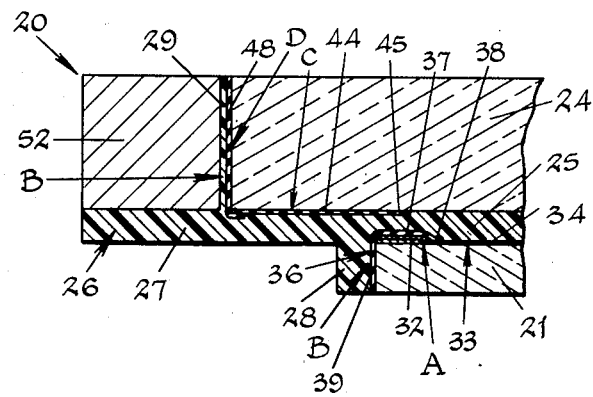
Fig. 4
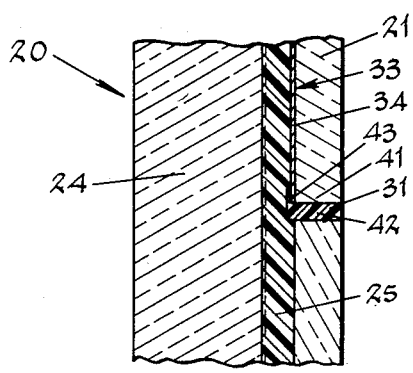
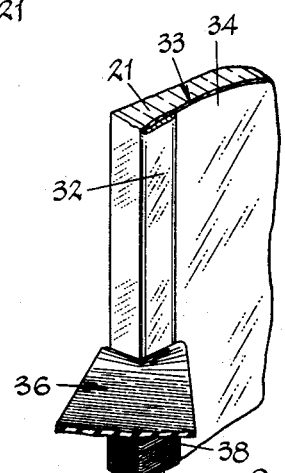
Fig. 6
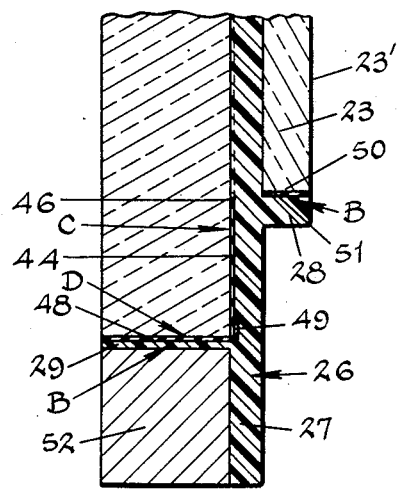
Fig. 5
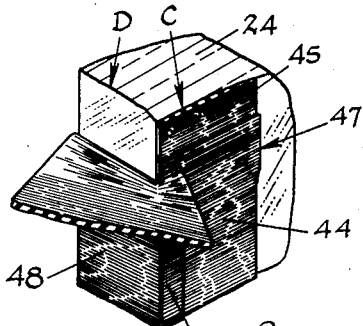
Fig. 7

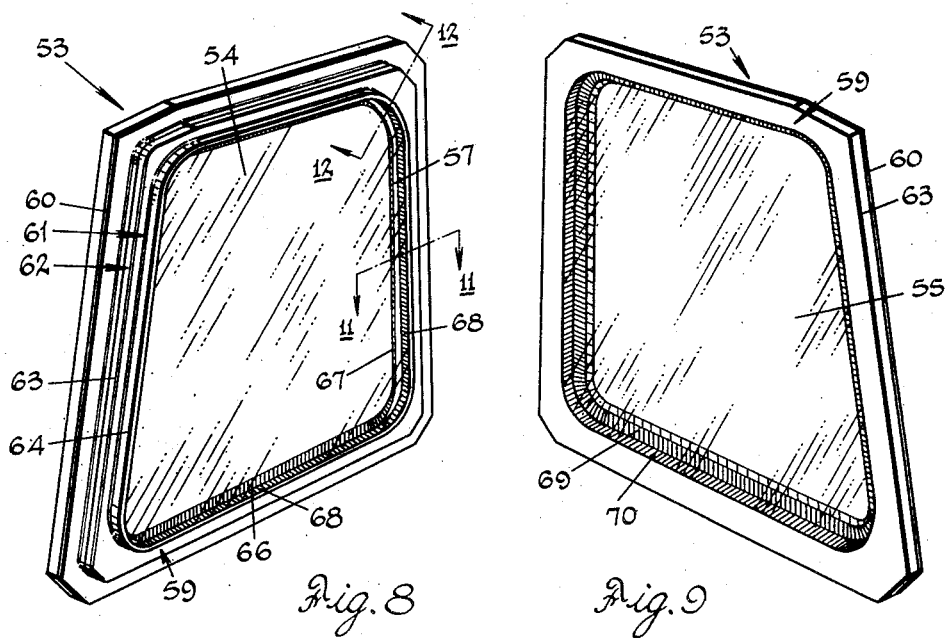
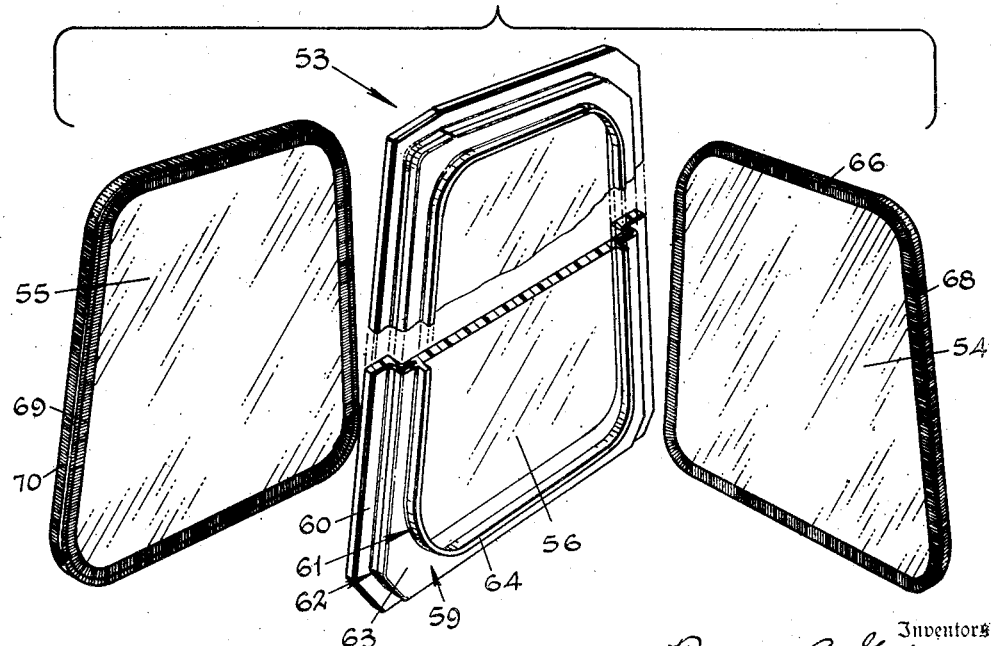

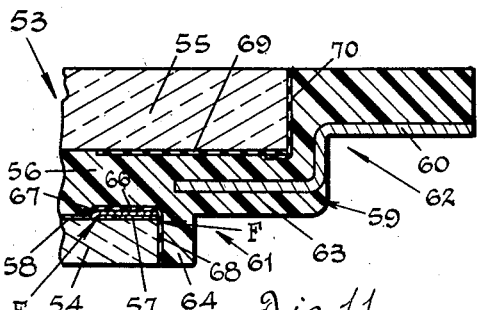
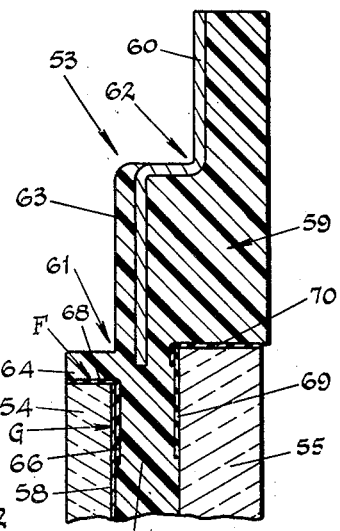
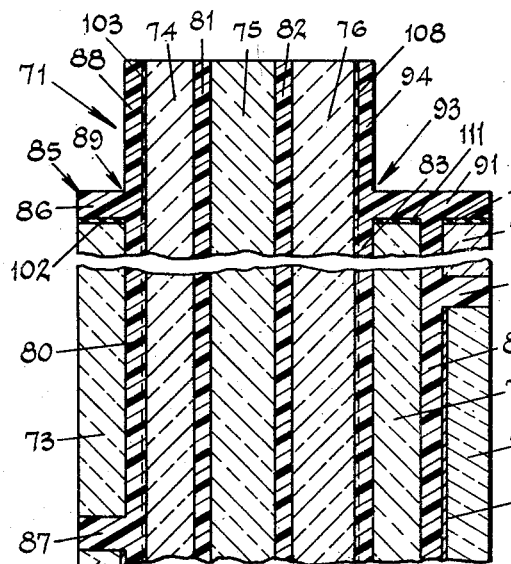
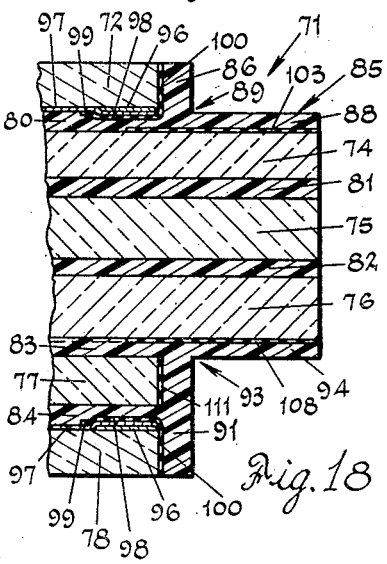
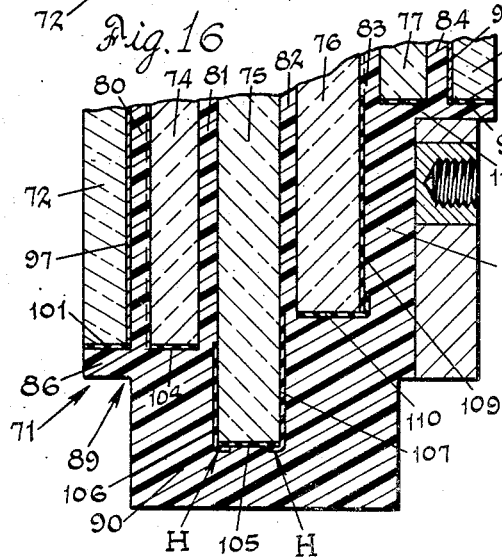

Sept. 1, 1953

R. A. GAISER ET AL 2,650,976

ELECTRICALLY CONDUCTING LAMINATED GLASS

Filed March 21, 1951

Inventors
Romey A. Gaiser
and James H. Boicey
By Robbe & Swope
Attorneys

Patented Sept. 1, 1953

2,650,976

UNITED STATES PATENT OFFICE 2,650,976

ELECTRICALLY CONDUCTING LAMINATED GLASS

Romey A. Gaiser and James H. Boicey, Toledo, Ohio, assignors to Libbey-Owens-Ford Glass Company, Toledo, Ohio, a corporation of Ohio Application March 21, 1951, Serial No. 216,768

14 Claims. (Cl. 201—73)

The present invention relates to laminated safety glass, and more particularly to electrically conducting laminated safety glass.

This application relates to the same general subject matter of invention as the copending application of Romey A. Gaiser, now Patent No. 2,584,859, Serial Number 49,932, filed September 18, 1948.

Laminated safety glass, per se, is well known in the art and, generally speaking, comprises two or more sheets of glass and one or more interlayers of tough, flexible thermoplastic material all bonded together under the action of heat and pressure to produce a unitary composite structure.

Electrically conducting laminated safety glass is a relatively new development and is similar in construction to ordinary laminated safety glass except that one of the glass sheets has an electrically conducting coating on an inner surface thereof. This electrically conducting coating may, for example, be a clear, transparent film of tin oxide as disclosed in the patent to Harold A. McMaster, No. 2,429,420, dated October 21, 1947, and in order to conduct electricity to and from the coating, electrodes are provided, usually along two opposite marginal portions of the coated glass sheet, and laminated into the unit.

To date such units have found their principal utility as de-icing windows or windshields in automobiles and aircraft, the electrically conducting coating being supplied with electrical energy sufficient to heat the unit to a temperature at which ice or frost will be removed from, or its formation will be prevented on, the surface of the exposed glass sheet.

Now ordinary laminated glass, as produced by present day techniques, is a very stable article even under severe temperature conditions. However, electrically conducting laminated glass presents additional problems due to the fact that, in use, the temperatures at the various surfaces of the unit may be, and usually are, widely divergent. For example, when employed as a window or windshield in automobiles traveling in cold climates, or in airplanes at high altitudes, the glass and plastic surfaces adjoining the electrically conducting coating will be exposed to quite high temperatures, the surface of the unit facing the interior of the vehicle will be exposed to normal room temperatures, and the outside surface of the unit will be exposed to temperatures which may be far below zero.

Because of the difference in coefficient of expansion and contraction between the glass and the plastic interlayer, such temperature differentials have resulted in repeated electrode failure within the unit, usually accompanied by glass separation or tearing at the edge of the unit.

However, we have discovered that by separating the glass from the plastic interlayer by a special tape or strip material at the marginal portion of the unit, over the area of the electrode on the glass, the possibility of electrode failure in such units can be greatly minimized if not entirely eliminated.

Such edge separation has also been found to occur, under such conditions, in laminated glass structures, that may or may not be electrically conducting, when the surface area of the plastic interlayer is greater than the surface area of either of the component glass sheets. This sort of structure is often described as being of the extended plastic type, in that there is created a perimeter flange of plastic which may, if desired, be employed for mounting the laminated structure.

In certain desirable constructions of this type of assembly, the perimeter flange may approximate, or be of, a thickness comparable to the overall thickness of the laminated structure. In other words, in addition to being formed so as to extend beyond the actual margins of the glass sheets, the plastic of the finally composited structure may be so shaped that it completely covers or encircles the edges of the glass sheets as a rim. By reason of this arrangement of the plastic, there are created areas of plastic to glass adhesion that are quite susceptible to edge separation and which may result, in extreme instances, in actual tearing of the glass itself.

This type of edge separation can also be prevented, according to the present invention, by employing the tape or strip material referred to above to separate the glass from the plastic interlayer and/or the extended plastic flange at the marginal portion of the unit and/or the edge of one or more of the glass sheets.

It is therefore the primary aim of this invention to provide a laminated safety glass unit, and a method of making the same that will eliminate injurious edge separation in the unit even under the most severe temperature conditions.

Another object is the provision of a special type of electrically conducting laminated safety glass unit, and a method of making the same, which will eliminate electrode failure in the unit under such conditions.

Another object is to eliminate injury to a laminated safety glass structure due to expansion and contraction of the plastic interlayer by the provision of an improved separator layer in the form of a special tape or strip material arranged between the marginal and/or edge portions of the glass and plastic surfaces in the unit.

A further object of the invention is to provide a separating layer of the above character which has slight or no adhesion to at least one of the glass or plastic surfaces with which it is in contact.

A still further object of the invention is to provide such a separating layer which is elastic in nature and remains so under severe temperature conditions.

Other objects and advantages of the invention will become more apparent during the course of the following description, when taken in connection with the accompanying drawings.

In the drawings, wherein like numerals are employed to designate like parts throughout the same:

Fig. 1 is a perspective view of one form of electrically conducting laminated safety glass structure, produced in accordance with the invention;

Fig. 2 is a perspective view of the reverse side of the structure shown in Fig. 1;

Fig. 3 is an exploded perspective view of the component parts of the structure shown in Figs. 1 and 2;

Fig. 4 is a horizontal, transverse sectional view taken through the structure on line 4—4 of Fig. 1;

Fig. 5 is a vertical transverse sectional view taken on line 5—5 of Fig. 1;

Fig. 6 illustrates in perspective one way of applying the tape type separating layer over the electrode and one edge of a glass sheet;

Fig. 7 is a similar view, also in perspective, and illustrates a different way of applying the separating tape or strip;

Fig. 8 is a perspective view of a second form of electrically conducting laminated safety glass structure;

Fig. 9 is a perspective view of the reverse side of the form of structure of Fig. 8;

Fig. 10 is an exploded perspective view of the component parts of the structure shown in Fig. 8;

Fig. 11 is a fragmentary, horizontal, transverse sectional view taken substantially along the line 11—11 of Fig. 8;

Fig. 12 is a fragmentary, sectional, detail view taken substantially along the line 12—12 of Fig. 8;

Fig. 16 is a fragmentary, vertical, transverse sectional view taken on line 16—16 of Fig. 13;

Fig. 17 is a fragmentary, vertical, transverse sectional view taken substantially along the line 17—17 of Fig. 13; and Fig. 18 is a fragmentary, horizontal, transverse sectional view taken on line 18—18 of Fig. 13.

Figure 13:
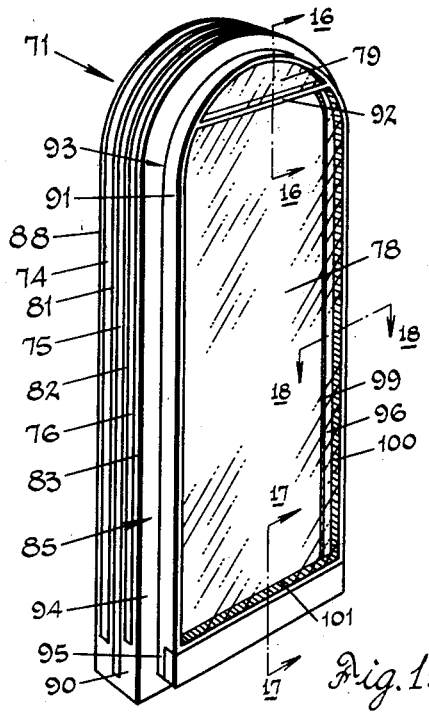
Fig. 13 is a perspective view of a third form of electrically conducting laminated safety glass structure.

In order to adequately set forth the advantages obtained through the use of the improved tape or strip type separating layer, an endeavor has been made to illustrate a variety of such uses by means of several, regular production, laminated safety glass structures in each of which there is included at least one glass sheet or panel having an electrically conducting coating on one surface thereof. In addition, these structures illustrate a number of different arrangements and associations of glass and plastic laminations. In each, however, there is a related type or form of assembly of a character which, in use, has heretofore proved to be particularly susceptible to electrode failure and/or edge separation.

For example, as indicated above, it has been found that a primary cause of electrode failure is the tendency of the plastic interlayer to expand and contract over the area of the electrode. This will be aggravated in instances where the plastic extends outwardly from the marginal areas of the glass into an area in which it is unsupported. It has also been found that the differential in coefficient of expansion and contraction between the glass and plastic may result in edge separation and/or glass fracture in areas not contiguous to the electrodes, when the extended plastic is unsupported or is bonded to a glass sheet on one side only.

As illustrated here, the special tape type separating layer can be satisfactorily employed to overcome edge separation, electrode failure and/or glass fracture, in any one or all of these situations.

Referring now more particularly to the drawings, there is shown in Figs. 1 to 5, inclusive, one typical construction of an electrically conducting laminated safety glass glazing unit for airplanes, produced in accordance with the invention. This particular unit, which is designated in its entirety by the numeral 20, has substantially straight, parallel side margins and arcuately formed ends or top and bottom areas which are formed to fit into the window opening of an aircraft which the structure is designed to glaze.

The unit 20, in a broad sense, is made up of two panels of ordinary plate or sheet glass of any desired composition, one or the other or both of which may be tempered or semi-tempered, and an interposed layer of a tough, flexible thermoplastic material, all bonded together under the influence of heat and pressure to provide a composite unitary structure. More particularly, the panel on one surface comprises a substantially rectangular, centrally disposed glass panel 21 and especially cut end panels 22 and 23 which are arranged above and below the panel 21, as is shown in Fig. 1 and at the right hand side of Fig. 3, to complete the desired outline of the structure 20. The panel on the opposite surface of this structure is a unitary glass sheet or plate 24 of a shape corresponding to the said outline of the unit, as is shown in Fig. 2 and at the left hand side of Fig. 3. Interposed between the glass sheets 21, 22 and 23 on the one side, and the glass sheet 24 on the other, is a layer 25 of thermoplastic material.

As will best be seen in Figs. 3, 4 and 5, this plastic interlayer 25 is actually the central membrane or web of a complete plastic carcass or body 26 for the structure 20. While, under the influence of heat and pressure of the laminating process, the plastic interlayer and associated parts become an integral mass, it is a well known and customary practice of such processes, to build up such a plastic body, as the body 26, from various and suitably cut and/or shaped layers and blocks of thermoplastic material. With this particular structure, the layer 25 of the body 26 extends outwardly into a perimeter flange 27 from which there are transversely extending rim-like flanges 28 and 29 that encircle the glass panels 21, 22, and 23, and the panel 24. That is to say, when the glass and plastic laminations that make up the unit 20 are all laminated together, a plastic wall or rim 28 will be formed to encircle the marginal edges of panels 21, 22 and 23 while a similar rim 29 will encompass the marginal edges of the glass panel 24. Since the panels 21, 22 and 23 are slightly spaced from one another along their adjoining and substantially abutting edges, spacers 30 and 31 of plastic or like material are provided between these separate panels.

In order to render the completed unit electrically conducting, the glass panel 21, which becomes the outboard light in the plane, is provided, prior to laminating, with suitable electrodes 32 along two opposite marginal portions of the inner surface 33 thereof, and with an electrically conducting coating or film 34 on this same surface. A number of different materials may be used for the electrodes 32 and they may be applied to the glass in any convenient manner. For example, electrodes of sprayed copper, sprayed copper alloys, copper foil, silver and platinum fluxes and combinations of these materials have all been used satisfactorily. To date, an electrode of the familiar silver bus bar material has been found to be as satisfactory as any.

According to one preferred method of applying the electrodes 32 and the electrically conducting film 34 to the glass panel 21, the two opposite marginal portions of the panel's surface 33 are first sprayed with an electrically conducting silver flux and then heated to fuse the flux onto the glass. The electrodes thus formed may then be electro-plated with copper to permit the soldering of suitable and necessary leads thereto. (While no lead wires are indicated in the drawings, it is to be understood that the required leads and conductor blocks can be readily embodied in this or any of the other structures herein set forth.)

With the electrodes 32 in place, the panel 21 is then ready to be filmed and this step may be accomplished by first heating the panel to approximately the softening point of the glass and then spraying the surface 33 with a solution of stannic tetrachloride to deposit a clear, transparent electrically conducting layer of tin oxide 34, on the glass, over, and in contact with, the electrodes 33. If desired, the heating of the glass preparatory to the filming can also be utilized to fuse the silver flux to the glass, thereby eliminating one heating step.

The filmed glass panel 21 is now properly prepared to be incorporated into an integral composite structure by, first, assembling it together with the panels 22, 23 and 24 and the necessary plastic elements to form the plastic body 26, which includes the interlayer 25, and then laminating the several layers of the assembled glass-plastic sandwich together, under heat and pressure, in accordance with any of the well known laminating procedures.

When this has been done an electrically conducting laminated glass unit, which is stable and entirely satisfactory when tested in the laboratory under ambient temperature conditions, is obtained.

However, under low temperature testing, or when used in vehicles in climates or under conditions where extremely low temperatures are encountered, such units exhibit too great a percentage of electrode failures. These failures, in the greatest percentage of cases are in the form of arcing along one or the other of the electrodes when the current is applied. Such arcing, of course, results in hot areas which place the glass in severe thermal shock often resulting in glass failure, and making the units undesirable commercially.

A great deal of work has been done in attempting to overcome this difficulty by employing different types of electrodes and by modifying, treating and redesigning the known types of electrodes. But it has been recently suggested that this electrode failure was not due to defects in the electrode itself but instead that it was due, primarily, to relative movement of the laminations resulting from excessive temperature differentials within the unit and the wide difference in expansion and contraction coefficients of the glass and plastic of the laminations. And this opinion has been substantiated by subsequent tests.

Thus, it was found that some of the tested units in failure in cold room testing at temperatures down to $-65°$ F. showed large areas where glass had parted from glass. In other words, the plastic to filmed glass bond and the film to glass bond showed adhesive forces greater than the cohesive forces in the glass itself.

Now the coefficient of linear expansion of polyvinyl butyral of the type used in commercial laminated safety glass is $52 \times 10^{-6}/°$ F. between $-90°$ F. and $-20°$ F.; and it is $121 \times 10^{-6}/°$ F. between $+75°$ F. and $+150°$ F.

On the other hand, the coefficient of linear expansion of the assignee company's automotive plate or color clear glass, used in windshields, is approximately $5 \times 10^{-6}/°$ F. in the above temperature ranges. Or, simply expressed, the linear expansion of the plastic is between 10.5 and 24 times greater than that of glass. Consequently, a structure composed of these well bonded materials having such widely varying coefficients of linear expansion is comparable to bi-metallic thermostat construction.

Moreover, in a laminated structure of this character, the film 32 which carries all of the current causes the surface 33 of the glass panel 21 to become hot while the opposite surface of the same panel, and which is preferably exposed to the outside, remains much cooler. Deflection measurements on unlaminated electrically conducting glass under these conditions show that such temperature differentials, between the opposite surfaces of the glass panel, causes a bending of the glass, with the filmed surface being on the convex side of the bend.

Of course, the filmed glass panel has this same tendency to bend when in a laminated unit; however, at the same time, the surface of the plastic interlayer 25 that is adjacent to the film 34 becomes hot while the other side of the plastic interlayer remains cold, and this causes a bending of the plastic interlayer with the convex side being adjacent to the film 34. Because of the tight bond between the filmed glass and the plastic, the tendency of the glass sheet to bend in one direction is overcome and it is actually caused to bend in the opposite direction.

In other words, when such structures are used in low temperatures, a flexing of the structure takes place which has a strong tendency to cause separation of the laminations around the periphery of the structure. Especially, since the edge of the glass where the flexing stresses are found in greatest concentration are also the points of greatest weakness. Consequently, due to the excellent filmed glass-plastic bond, fracture and separation in the glass itself takes place in these areas.

In the same way, the bond between the silver flux or the filmed silver flux of the electrode 32 and the plastic interlayer 25 has proved, under test, to be approximately the same as that between the plastic and the glass, and, since the linear coefficient of expansion of the electrode is comparatively close to that of the glass, the enormous stresses set up by the expansion and contraction of the plastic and the filmed glass will obviously cause electrode failure. Particularly, since a very slight movement of the electrode with respect to the base glass will result in an electrode to film interface separation and cause unavoidable arcing and possible glass failure.

This confirmed the more recent theory that electrode failure in these structures really involves two distinct problems. First, the problem of the plastic expanding over the electrode area and causing a separation of the film at the electrode-film interface (indicated at A in Fig. 4); and second, the problem of glass separation and fracture at the edges of the unit due to unequal coefficients of expansion plus flexing of the unit due to unequal heating.

This problem of glass fracture or separation is particularly troublesome with so-called extended plastic type units even in areas that are not contiguous to an electrode or an electrically conducting film. For example, in areas such as indicated at B in Figs. 4 and 5 where some part of the plastic body 26 would heretofore have been tightly bonded to the glass on one side but unsupported by a glass sheet on the other, the enormous forces set up by the differences in expansion and contraction between the glass and plastic will in many cases be sufficient to literally pull or tear the nearest exposed corner from the glass to give an effect similar to that caused by chipping of the corner of the glass sheet.

According to this invention, we overcome these difficulties of electrode failure and/or glass fracture and separation in electrically conducting and/or extended plastic types of laminated safety glass by the provision of a tape or strip type separating medium between the electrode area, and/or selected glass areas, and the contiguous plastic surface prior to laminating the glass and plastic layers together into a unitary structure.

Thus, in some instances, the separating tape will be applied to the electrode, before it is placed in contact with the plastic interlayer, and, in a preferred form, the tape on the electrode may extend downwardly over the adjacent edge of the glass sheet. In another form, the tape will be be applied to the edges of any or all of the glass sheets used in making up the unit and will extend over the inner marginal areas of such sheet or sheets.

In Fig. 6 there is illustrated a preferred way of applying a single layer of tape over the electrode area and the adjacent edge of a filmed glass sheet such as the panel 21; and in Fig. 7 there is shown another preferred method of applying the tape, this time over the margin and contiguous edge of a non-filmed glass sheet, such as the panel 24, employing two strips of tape in overlapping relation.

Any one of a number of different types of tape can be used for the purpose because, as explained above, the purpose of the tape is to separate the glass and/or the electrode from the plastic layers at the danger points in the unit. Or, in other words to prevent the normal intimate bond between the glass and plastic and/or between the electrodes and plastic in the areas of the unit where the cohesive forces of the plastic to electrode, or the plastic to glass, will result in the shifting of the electrode on the glass, or the tearing of the glass, under the disruptive forces exerted by the differential in expansion and contraction between the glass and plastic.

Consequently, the tape may be of a nature that will permit it to function either as a parting or an elastic separating material. In the first case, the tape may be non-adherent to either the glass surface or plastic surface, or the electrodes surface or plastic surface; or it may be adherent to one surface or the other but not to both. In the second case the tape may be adherent to one or the other or both surfaces but will be sufficiently elastic or extensible at low temperatures to accommodate relative movement between the adjacent glass and plastic, or electrode and plastic surfaces. In a third case the tape will be so slightly adhered to either one or both of the opposed surfaces that it will creep along these surfaces as it expands and contracts under temperature differentials.

Among the tapes that we have successfully used are:

Silicone tape.
Rubber tape.
Friction tape.
Scotch tape (transparent and opaque).
Adhesive tape (surgical type).
Polyethylene tapes.
Varnished Cambric tape.
Teflon tape.
Resin impregnated cloth tape.

At the present time, in actual commercial production we use a flexible ribbon or tape sold by the Minnesota Mining & Manufacturing Company as their "Electrical Tape No. 33" in all areas where transparency is not a requisite. This tape is elastic at temperatures from −70° F. to +120° F. and has good tensile strength. It also has good dielectric strength properties and a dielectric capacity well over the range of voltages within which the electrically conducting film 34 operates.

It is obtainable in roll form and is adhesive on one side which permits it to be applied rapidly and efficiently by merely unrolling lengths or strips thereof and carefully directing such lengths against and onto the desired glass and/or electrode areas.

For example, as shown in detail in Fig. 6, as one step in producing the unit shown in Figs. 1 and 2 of the drawings, a length of tape 36 is applied along the marginal areas of one surface of the glass sheet 21 (Figs. 3, 4 and 6) so that the one side 37 of the tape will adequately cover the electrodes 32 and will overlap inwardly a sufficient distance, as indicated at 38 in Fig. 4, to insure that the entire width of the electrode is thoroughly separated from the plastic. This overlapping of the electrodes by the tape 36 may, for the purposes of illustration, be in the order of $\frac{1}{32}$ of an inch. The overhanging side 39 of tape is now brought around and adhered to the edge of the panel 21.

In a preferred construction, although the invention is not limited thereto, the upper and lower horizontally disposed edges 40 and 41 of the panel 21 are covered and protected by a transparent barrier or spacer formed by a layer, as indicated at 42 in Fig. 5, of cellulose tape, similar to that generally known as transparent Scotch tape, which is applied to the edges 40 and 41 in the same manner as the tape 36 along the vertical edges of the panel. This tape layer 42 is preferably produced by applying the tape along the said edges and doing so in such a manner as to create a narrow margin 43 of the same on and in contact with the marginal end areas of the electrically conducting coating 34. While the lower edge 41 is illustrated in Fig. 5, it is to be understood that the upper edge 40 is covered in a similar manner and, in each case, will create the transparent spacers 30 or 31 between the panel 21 and panels 22 and 23. Alternately, and as will be hereinafter described, the spacing between the panel 21 and the panels 22 and 23 may be filled by a rib of the thermoplastic interlayer material.

As the next step in the production procedure, tape is applied to the glass panel 24, as shown in Fig. 7. As therein set forth, the tape is applied to the margin of the surface of the panel, as indicated at 44, so that it will cover a marginal spacing of its own width. As shown in Figs. 4 and 5, a desirable width of separating tape on the surface of this glass panel 24, will be of such span as to extend inwardly from the immediate edge corner to the vicinity of any or each separating tape related to the opposite glass panel. Thus, as shown in Fig. 4, the extreme inner edge 45 of the tape 44 will be located directly opposite to and well within the area of the separating tape 36 associated with the panel 21 and covering the electrodes 32. Or, as in Fig. 5, the inner edge 46 of the tape 44 will be arranged so that it will register with other separating tape layers associated with the opposite lower glass panel 23 but will not extend into the visual area of this lower panel 23. In a like manner the tape 44 on the upper margin of the glass sheet 24 will not extend into the upper visual area of the top panel 22.

In completing this application of the tape 44 the free end is brought up and well over the first laid end of the tape, as indicated at 47 in Fig. 7. An additional length of tape, such as the tape 48, is now applied to the edge of the panel 24 and continuously affixed thereto until the free end may be secured in overlapping relation to the first laid end. During this applying of the tape 48, one marginal edge is disposed so that it may be rolled over and sealed to the adjoining edge of the tape 44, as indicated at 49. The separating tape layer thus formed separates not only the margin C of the panel 24 from the plastic but also the edge D and further the overlapping of the tapes across the corner of the panel as well as at their respective ends assures a positive integral layer which will have been sealed back upon itself or an associated tape of the same character.

As indicated above, the function of the tape 36 is to permit the plastic interlayer 25 to expand and contract freely over the area of the electrode 32 without injuriously affecting the electrode in any way and without the plastic having any tendency to move the electrode within the structure or to pull it from the glass or out of contact with the film 34. The carrying of this tape 36 over and downwardly across the edge of the panel, also aids in effectively preventing electrode failure. Thus, this extension of the tape, or separating layer, downwardly over the edge of the glass is expressly to prevent the plastic rim 28 from becoming tightly bonded to the glass edge; otherwise the edge of the electrode and/or the glass may be exposed, when the structure cools, because of the difference in expansion and contraction which, in some cases, will be sufficient to cause glass to part from glass thus tearing or separating the film 34 on the glass surface.

Similarly, the function of the separating tape layer 44 is to permit freedom of expansion and contraction of the plastic interlayer over the marginal areas of the opposed glass panel 24 as it is affected by the temperature differentials created between the different laminae of the structure. As previously stated, these margins and/or edges of the glass panels are the areas most vulnerable to the flexing stresses produced by the movement of the plastic relative to the glass and which are of greatest concentration outwardly from the tight plastic to glass bond. It has been found from successive specimen tests that the tape will elastically cleave from or shrink along the glass surface as the plastic moves and ultimately return to substantially its original position when normal temperature conditions are resumed.

In the particular electrically conducting laminated safety glass unit 20, the glass panels 21, 22 and 23 are, as previously mentioned, bounded by the plastic rim 28 while the single panel 24 is similarly bounded by the plastic rim 29. Each of these rims is located outwardly from the centralized area of the interlayer 25 contiguous to the film 32 on the panel 21 and consequently are more exposed to the effects of the high differences of expansion of the plastic and the glass since each is literally unsupported on one side (i. e., not bonded to a glass sheet) and can freely express to a maximum degree the extent of expansion or contraction accorded to it.

This is particularly true in the case of the plastic rim 29 since it is an integral though laterally directed portion of the outwardly extended flange 27 of the plastic body 26. Now this extended flange 27, while properly secured to a mounting surface, is nevertheless, and in so far as the structure 20 is concerned, free to shift with the expansion and contraction of the parent plastic body, and yet its reaction to such expansion and contraction may obviously be at an accelerated or retarded rate by reason of the fact that it and the integral rims 28 and 29 are simultaneously exposed at their outer surfaces to effects of varied temperature differentials, which may or may not be the same as those exciting a change of the temperature conditions at the various other contiguous and bonded plastic and filmed glass or unfilmed glass surfaces of the structure. Consequently by providing separating layers, as created by the tapes 36, 44 and 48, the plastic within these areas will be in contact with such tape layers rather than with the glass, and the subsequent expansion and contraction of the plastic will be dissipated by the elastic nature of the tape which will support the movement of the plastic material.

Provision is also made to carry the advantages of these separating tape layers into the intimately adjoining areas of the panels 22 and 23 and the rim 28. As shown in Fig. 5, the effect of these same differential of temperature conditions is imminent across the edge 50 of each of said panels, and particularly the panel 23 as herein shown.

As will be observed in this figure the inner surface of the panel 23 is tightly bonded to the plastic interlayer 25 and, in this area, the plastic interlayer is similarly tightly bonded to the opposing glass panel 24. The movement of the plastic in this area will therefore be equally supported at each plastic to glass interface and the tendency to shear glass from the panel 22 or 23, due to the different coefficients of expansion will be below the failure point of the glass.

However, in the case of the edges 50 of these glass panels, the associated plastic rim 28 is supported only at one side and consequently is capable of such a drastic difference of movement as to cause glass to part from glass at the corner adjacent the exposed surface 23'. In this particular structure, therefore, a layer of tape 51, should be applied to these edges 50.

In accordance with a preferred construction of the unit 20, a ring 52 of suitable composition, such as phenolite or Masonite, may be incorporated into the unit for installation or mounting purposes, by disposing it about rim 29. It has been found, however, that such a ring does not influence the relation of the plastic and the glass and has no actual function of supporting the plastic in the laminated structure in so far as interrelation of movement of the plastic to the glass is concerned.

After applying the tape separating layers over the necessary areas of the several glass components of the unit 20 in the manner just described, the taped panels are combined with the plastic interlayer as explained above, and the glass-plastic sandwich is then composited into an integral unit by any of the well known laminating procedures.

As also explained above, this electric tape No. 33 is provided with an adhesive on one side so that it will stick lightly to the glass as it is applied and will remain in place during assembly. After the laminating procedure, the non-adhesive side of the tape will also be found to have adhered to the plastic. However, the adhesion in either case is so slight that the tape can be readily pulled from either the glass or plastic surfaces.

The present invention as applied to a specifically different multiple sheet, electrically conducting, laminated safety glass unit, is illustrated in Figs. 8 to 12, inclusive. In this case separating layers of the elastic, dielectric tape are employed to protect the entire perimeters of each glass panel of an electrically conducting laminated safety glass unit, designated in its entirety by the numeral 53 and comprising two glass panels 54 and 55 and an interposed layer 56 of tough, flexible thermoplastic material, all bonded together under heat and pressure to provide a unitary composite structure.

The glass panel 54 carries electrodes 57 and an electrically conducting film 58 on one face thereof, while the glass panel 55 is unfilmed and, as shown, is slightly larger in area. These panels are more or less embedded in a plastic body 59, which includes a centrally disposed membrane or web 56 lying between the glass sheets, a marginal or flange portion 63 which extends outwardly beyond the edges of the glass and has incorporated therein a thin metal reinforcing member or frame 60.

The extended flange 63 embodies two peripheral stepped or rabbeted portions, as indicated at 61 and 62, and a lateral extension 64. Thus in this construction, the panel 54, as well as the panel 55, is bounded by areas of plastic heretofore described as unsupported or, differently expressed, which are outwardly of the interlayer between the glass sheets and which have at least one surface that is not covered by glass.

As pointed out above, the resultant effect of such a construction is to impose unusual stresses upon the marginal areas and edge areas of each glass panel due to the different coefficients of expansion and contraction of the glass and plastic.

While the manner of arranging the tape as a separating layer in this particular unit is clearly set forth in Fig. 10 wherein the glass panels 54 and 55 are shown apart from the plastic body 59, the actual location in detail is best shown in Figs. 11 and 12.

Thus, the electrodes 57 are covered by a tape layer 66 which is extended inwardly over the inner edge of said electrodes, as indicated at 67, and outwardly and downwardly over the edge of the glass panel 54 as at 68. The tape 66 is applied continuously around the marginal and edge periphery of the panel 54 to afford an integral continuous edge layer.

This locating of the separating tape layer provides effective protection at the electrode-plastic interface; at and along the glass-plastic interface at the adjoining edge of the glass; and, further, along and over the marginal and edge plastic-glass interfaces at the other two sides of the filmed panel. Consequently, this separator tape layer will prevent separation of the film at the electrode-film interface (indicated at E in Fig. 11), glass separation completely around the panel and at the edges of the structure (indicated at F in Figs. 11 and 12) and film from glass separation at G.

The glass panel 55 is prepared with tape to form the separating layer in substantially the same manner as was the glass panel 24 of the laminated structure 20—that is to say, one tape 69 is affixed to the margin of the panel's surface while a second tape 70 is applied to the edge of said panel and so as to cover and be sealed over the outer edge of the tape 69.

Figure 14:
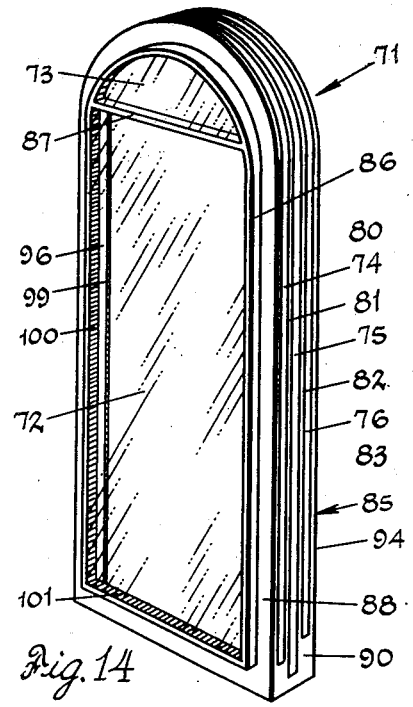
Fig. 14 is a perspective view of the reverse side of the structure shown in Fig. 13.
Figure 15:
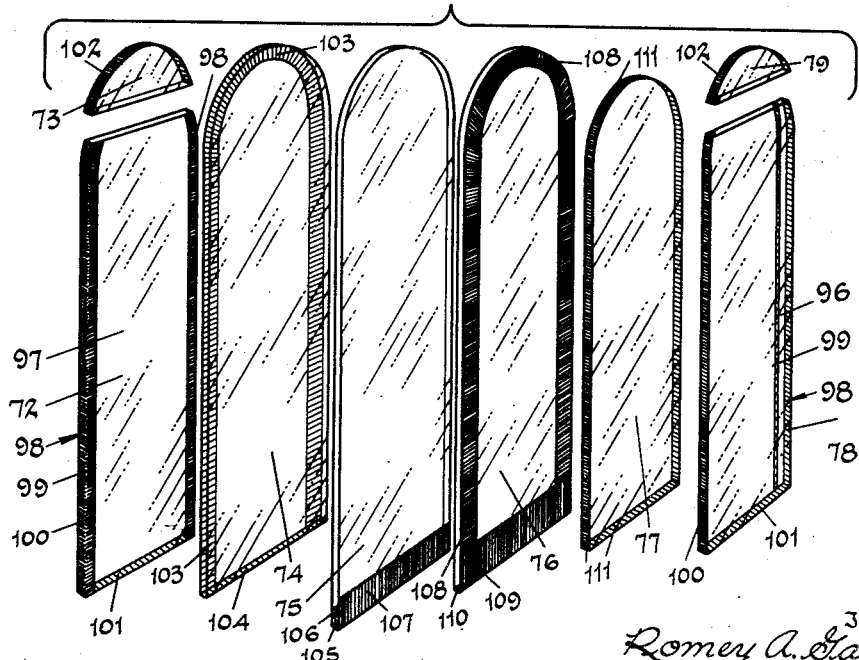
Fig. 15 is an exploded perspective view of the component glass sheets of the structure shown in Fig. 13.

In Figs. 13 to 18, inclusive, the invention is shown as applied to still another form of commercial multilayer, electrically conducting laminated glass. In this case a multiplicity of glass panels are assembled with interposed plastic interlayers to provide a bullet-resisting type of electrically conducting laminated safety glass unit 71. This particular construction includes several dimensional sizes of glass panels and a further distinguishing feature is found in the fact that one surface of both of the outer glass panels, or the major portions thereof, are provided with electrically conducting films. As will be seen in Fig. 15, wherein the several panels of glass are arranged according to their order and position in the unit, the tapes which provide the separating layers are arranged in some instances in a manner typical to the panels of the structures 20 and 53, hereinbefore discussed, while in other instances, these tape layers are applied in a somewhat different manner, while acting to afford the same protection. This is due to the differences of size and position of these panels in this particular structure.

More particularly, as illustrated in Figs. 15, 16, 17 and 18, there are provided, in this embodiment of the invention, six glass panels, identified by the numerals 72 to 79 inclusive, and arranged in spaced face to face relation. Of these, the panels or pieces 73 and 79 are of small size and are in the shape of a segment of a circular area. These pieces serve to complete the area of the panels 72 and 78 to the desired overall dimensional outline of the laminated structure.

Interposed between the opposed faces of each of the glass panels 72 to 79 are plastic interlayers 80 to 84, inclusive. Since the plastic body 85 of this particular laminated structure is of a somewhat complex nature reference is made to the cross-sectional details of the completed unit as shown in Figs. 16, 17 and 18. Arranged in their proper order as therein shown, the interlayer 80 is between the glass panels 72—73 and the panel 74; the interlayer 81 between panels 74 and 75; the interlayer 82 between panels 75 and 76; the interlayer 83 between panels 76 and 77, and the interlayer 84 between the panel 77 and panels 78—79.

It will also be noted that each of these glass panels is of a different dimension in either its length or width, and, in this particular construction, some of the panels are of different thicknesses. Thus it will be seen that by reason of the arrangement of these various panels, the overall size of the plastic body 85 will be equal to the width of some of the panels while in other instances it will be formed, at completion of the laminating process, so as to encircle certain of the panels. That is to say, at one outer surface of the unit 71, the panels 72 and 73, in total length and overall width are smaller than the adjoining panel 73 and that a plastic rim 86 will surround the former panels and a spacing rib 87 will be formed between their adjacent parallel edges. Likewise, while the panels 74, 75 and 76 will have the same upper or top contour, in agreement with the outline of the structure, and the same width, they differ in length and this difference is expressed in the relative positions of their lower edges.

That portion of the plastic body 85 which creates the rim 86 may also be extended outwardly and shaped to form a flange 88 which will produce a rabbeted area or shoulder 89 that will be located across the top of the structure and downwardly along both of the sides. However, at the bottom of the structure, as clearly shown in Fig. 17, the panels 74, 75 and 76 are completely enclosed in a materially thickened portion of the plastic body 86, as at 90, which thickened portion may be produced, during assembly, by properly shaped filler blocks of the thermoplastic material.

Now, at the opposite outer surface of the structure (Fig. 18), the panels 77 and 78—79 will be seen to have an equal width to the panel 72—73, and that their top edges, mainly of the panels 77 and 79, are disposed at substantially the same horizontal plane as the top edge of the panel 73 (Fig. 16) while their overall or combined lengths are materially less than any or all of the other component glass panels. The plastic body 85 will accordingly be formed to provide rim 91 encircling the upper end edges of the panels 77 and 79 and the side and bottom edges of the panels 77 and 78, and also a spacing rib 92 between said panels 77—79. A rabbeted or shoulder portion 93 will thus be formed about these particular glass panels 77 and 78—79 and the surfaces of this portion 93 will be formed by the rim 91 and the extended plastic surface 94 at the top and sides of the structure, and by the upwardly extending section 95 of the thickened body portion 90.

In view of the multiplicity of layers of glass in this particular unit, it is considered to be desirable to provide means for de-icing, or preventing the formation of ice on, both the inboard and the outboard panel of the unit. To this end, the panels 72 and 78 are, prior to laminating, provided with the necessary electrodes 96 along two opposite margins of each in the manner already set forth in detail above. The surfaces of the panels 72 and 78 which support these electrodes are then coated with an electrically conducting film 97.

From the foregoing it will be seen that in this electrically conducting, laminating safety glass unit 71, separating tape layers can be effectively interposed at several of the surfaces of the laminae to render the unit more stable in accordance with this invention. These tapes should be of the same general character and function as those earlier disclosed, or of such a related character that they will serve the same intended purpose.

Consequently, the panels 72 and 78 are preferably provided with such separating tape layers as will cover the area of the electrodes 96 and extend downwardly over the edge in a manner similar to that illustrated in Fig. 6. That is to say, a tape 98 is applied so that its inner edge 99 will overlap the width of the electrodes by approximately $\frac{1}{32}$ of an inch and the opposite edge 100 will be brought downwardly and adhered to the edge of the panel. The lower edge of each of these panels 72 and 78 is also equipped with a tape layer 101 in order that these edges which are opposite to the rims 86 and 91 will be separated therefrom by an adequate separating layer. In the same manner, the upper ears or panels 72 and 79 are covered along their outer edges by tapes 102.

Similarly, the centrally disposed glass panels are provided with a separating layer or covering of tape and this application is directed to those areas of each panel which require protection from the consequences of the expansion differentials existent between the outermost areas of the plastic body and the glass.

With this in view, the surface of the panel 74, as shown in Figs. 15 to 18, inclusive, is provided with a marginal separating layer in the form of the tape 103 which is applied continuously on said margin from one lower corner, upwardly, across the top and downwardly to the opposite lower corner. The lower or bottom edge of the panel is also provided with a tape layer 104. The surface of this glass panel is thus separated from the extended flange 88 of the plastic body and the bottom edge is likewise separated from the plastic embodying the thickened lower portion 90 of said body. Preferably the tape 103 is provided in such width that the inner edge thereof will register with the correspondingly located layer 102 on the panel 73 across the top area thereof, as seen in Fig. 16, and well into registry with the marginal area of the tape 98 which provides the separating layer over the area of the electrodes 96 along the margins of the panel 72.

Since the plastic body of the interlayer 80 is extended outwardly as the flange 88 in the vicinity of the top and side margins of the glass panel 74 and further by the provision of the rim 86 throughout this same area, there will exist here plastic areas which are unsupported, or which are bonded to glass at one surface only. This creates an area of considerable extent in which, in the absence of the separating layers of this invention, the forces set up by the differences in expansion and contraction between the glass and plastic could cause movement of the plastic which would tear the glass to which it is integrally bonded.

On the other hand, since the marginal areas of both surfaces of the interlayers 81 and 82 are bonded to the glass panels 74, 75, and 76, no separating layers need be provided except across the bottom areas or ends of the said panels where the respective interlayers merge into the thicker portion 90 of the plastic body. This thickened plastic portion will be more responsive to thermal conditions than any of the interlayers 81, 82 and 83, and each of them are supported by the tightness of their interfacial bond to the glass while said portion 90 will be susceptible to all ambient temperature conditions and will be unsupported, by or unbonded to glass, along its lower edge. The glass panels 75 and 76 should therefore be provided with tape to afford separating layers on their surface areas projecting from the immediate vicinity of the plastic forming the individual interlayers 81 and 82.

Thus, as with the tape 104 on the lower edge of the panel 74, tape 105 is applied to the glass 75 across the bottom edge thereof while tapes 106 and 107 are arranged on its opposed lower margins and so as to overlap the adjoining edges of the tape 105. The tape 105 affords a separating layer between the plastic and the glass over that area of the panel extending downwardly beyond the horizontally aligned lower edge of the panel 74 and the emergence of the interlayer 81 into the thicker portion 90 of plastic. Likewise, the tape 107 spans the surface of the panel 75 facing the panel 76 but extending beyond the lower edge thereof. The tapes 105, 106 and 107 thus cover those areas of the panel 75 that are not bonded to a supported area of plastic—the support in each case being constituted by a plastic to glass laminated bond on both sides of the plastic. It will be noted that the lower edge corners of the panel 75 are thus protected from the disruptive action created by movement of the unsupported plastic by the overlapping and sealing of the tapes 106 and 107 to the tape 105 as indicated at H.

The glass panel 76, as seen in Figs. 15 to 18, inclusive, is of the same width and has the same top contour as the panels 74 and 75 but is, as shown particularly in Fig. 17, relatively shorter than either of the associated panels. The surface of this panel 76 facing the next panel 77 is equipped with a separating layer which is produced by a continuous layer of tape 108 applied to the top and side margins thereof and extending from one lower corner to the opposite lower corner. Across the lower margin of the panel 76, a tape layer 109 is applied, having ample width to span the marginal surface from the bottom edge to a line opposite the bottom edge of the glass panel 77. The bottom edge of panel 76 is also covered by tape 110 which is brought around into overlapping and sealing relation with the tape 109. As in the case of the panel 74, the panel 76 will now be protected from disruptive movement of the unsupported plastic in response to interior temperature conditions and/or those exterior temperature conditions which may affect expansion or contraction of the extended flange 94 adjoining the perimeter of the panel and the upwardly directed section 95 of the plastic body 85.

In a somewhat different manner, the panel 77 is provided with a separating layer solely on its peripheral edge. As shown in Figs. 15 to 18 inclusive, the plastic interlayers 83 and 84 are tightly bonded to this panel 77 and in like manner said interlayers are similarly bonded to the opposed panels 78, 79, and 78. These particular interlayers 83 and 84 are therefore thoroughly supported. The panel 77, however, is encircled by the plastic rim 91 which is unsupported by glass at its outer face. For this reason, a separating layer should be provided and is afforded by the continuously applied tape 111 which is applied to the edges of the panel 77 and overlappingly adhered to itself in the manner shown in Fig. 7 in connection with the tape 44.

Having previously mentioned the plastic ribs 87 and 92, it will be noted that the opposing edges of the glass panels 72 and 73, and likewise the panels 78 and 79, will require no separating layer since both sides of these plastic ribs are tightly bonded to and supported by the edges of the panels. In addition, these ribs are integral parts of the respective interlayers 80 and 84 that are bonded to the panels 72, 73 and 74 and, in a like manner, the panels 77, 78 and 79.

As discussed in connection with the structure 20, the ribs 87 and 92 may be formed of a suitable transparent cellulose tape layer that is applied to protect the extremities of the electrically conducting coatings. This is, however, an obvious alternative procedure in the assembly and of no import to the stability of the structure.

When assembled and the structure is properly laminated, it will be found that by the provision of the various separating layers, not only the electrodes 98 on the panels 72 and 78 but also marginal and/or edge surfaces of other associated panels will be protected from disruptive movement of the plastic attributable to the differentials of coefficients of the plastic and the glass. Also these separating layers will serve to sustain the movements of the unsupported plastic areas which are requisite to the proper formation of a laminated safety glass structure of the character described.

According to this invention, laminated glass structures, and particularly electrically conducting laminated safety glass structures, will have their stability greatly improved by the use of the separating tape layers employed as herein set forth and described. When these layers are supplied in the form of an elastic dialectric material, they will provide a separating layer of floating character so that under flexing or relative movement created by the reactions of the different laminae to varying temperature conditions, there will neither be shifting of the electrodes from their fused relation to the glass nor separation of glass from glass with consequent failures of the unit.

Although the invention has been explained in connection with laminated glass units made up with two or more sheets of glass and one or more interposed layers of plastic, it will be obvious that it can also be applied to simpler types of laminated units made up with one sheet of glass and a layer of plastic integrally bonded thereto. In fact, it is to be understood that the forms of the invention herewith shown and described are to be taken as illustrative embodiments only of the same, and that various changes in the shape, size and arrangement of parts, as well as various procedural changes may be resorted to without departing from the spirit of the invention or the scope of the subjoined claims.

We claim:

1. In a laminated safety glass unit comprising at least one sheet of glass and a layer of non-brittle thermoplastic material integrally bonded thereto, a strip of dielectric tape between the glass sheet and the plastic layer adjacent a margin of said glass sheet and separating the glass from the plastic along said tape layer.

2. In a laminated safety glass unit comprising at least one sheet of glass and a layer of non-brittle thermoplastic material integrally bonded thereto, a strip of dielectric tape between the glass sheet and the plastic layer along an inner margin of said glass sheet and separating the glass from the plastic along said tape layer.

3. In a laminated safety glass unit comprising at least one sheet of glass and a layer of non-brittle thermoplastic material integrally bonded thereto, a strip of dielectric tape between the glass sheet and the plastic layer along an inner margin of said glass sheet separating the glass from the plastic and extending over onto an adjacent edge of the glass sheet.

4. In a laminated safety glass unit comprising at least one sheet of glass and a layer of non-brittle thermoplastic material integrally bonded thereto over a surface thereof and extending outwardly beyond the glass sheet with a portion of the extended plastic being integrally bonded to an edge of said glass sheet, a strip of dielectric tape between said edge of the glass sheet and the plastic interlayer and separating the glass from the plastic.

5. In a laminated safety glass unit comprising at least one sheet of glass and a layer of non-brittle thermoplastic material integrally bonded thereto, a strip of elastic dielectric tape between the glass sheet and the plastic layer adjacent a margin of said glass sheet and separating the glass from the plastic along said tape layer.

6. A laminated safety glass unit comprising at least one sheet of glass and a layer of non-brittle thermoplastic material integrally bonded thereto over a surface thereof and extending outwardly beyond the glass sheet, a thickened portion on the extended part of said plastic layer integrally bonded to an edge of said glass sheet, a strip of dielectric tape between the glass sheet and the plastic layer along a margin of said glass sheet adjacent said edge, and a second strip of dielectric tape between said edge of the glass sheet and the thickened portion of the extended plastic layer in overlapping relation to said first mentioned strip of tape.

7. In a laminated safety glass unit comprising two sheets of glass and an interposed layer of non-brittle thermoplastic material all bonded together into an integral unitary structure, a strip of elastic dielectric tape between a margin of at least one of said glass sheets and the plastic interlayer.

8. In an electrically conducting laminated safety glass structure comprising two sheets of glass and an interposed layer of non-brittle thermoplastic material all bonded together into a unitary structure and in which the thermoplastic material extends outwardly from the glass sheets and substantially encloses the edges of said sheets, electrodes along opposite margins of the surface of one of the glass sheets facing the thermoplastic material, a coating of electrically conducting material also on said surface and in contact with said electrodes, a layer of dielectric tape covering the areas of each of the electrodes and extending over the adjoining edges of the glass sheet to separate the same from said thermoplastic material, and a layer of dielectric tape covering inner margins of the second sheet of glass and extending onto the adjoining edges thereof.

9. An electrically conducting laminated safety glass structure comprising two glass panels one of which is composed of a single sheet of glass and the other of which is composed of a middle sheet of glass and sheets of glass above and below said middle sheet, an interlayer of non-brittle thermoplastic material interposed between said glass panels and integrally bonded thereto to produce a unitary structure, said thermoplastic material extending outwardly beyond the glass panels and having a thickened portion thereof substantially enclosing the edges of said panels, electrodes along opposite margins of the surface of the middle sheet of said second mentioned opposite panel facing the thermoplastic material, a coating of electrically conducting material also on the said surface and in contact with said electrodes, a layer of dielectric tape covering the electrodes and extending over onto the adjoining edges of the middle glass sheet, a strip of dielectric tape covering the outer edges of the glass sheets arranged above and below the coated middle sheet, and a layer of dielectric tape covering the margins and extending over onto the adjoining edges of the first named panel.

10. An electrically conducting laminated safety glass structure comprising two glass panels, one of which is composed of a single sheet of glass and the other of which is composed of a middle sheet and sheets of glass above and below said middle sheet, an interlayer of non-brittle thermoplastic material interposed between said glass panels and integrally bonded thereto to produce a unitary structure, said first mentioned panel having a greater area than the area of the plurality of sheets constituting the second mentioned panel, said thermoplastic material extending outwardly beyond both of the glass panels and having thickened portions substantially enclosing the edges of said panels, electrodes along opposite margins of the surface of the middle sheet of the said second mentioned panel facing the thermoplastic material, a coating of electrically conducting material also on said surface and in contact with said electrodes, a layer of dielectric tape covering the electrodes and extending over onto the adjoining edges of the middle glass sheet, a layer of dielectric tape covering the outer edges of the glass sheets arranged above and below the coated middle sheet, a layer of dielectric tape covering the margins of the first mentioned panel, and extending over onto the adjoining edges of said panel whereby said last mentioned layer of dielectric tape will separate the said first mentioned panel from the thickened portions of the thermoplastic material outwardly of the integral bond between the said material and the glass panels.

11. An electrically conducting laminated safety glass structure comprising two glass panels, one of said panels having a greater surface area than the other of said panels, an interlayer of non-brittle thermoplastic material interposed between the glass panels and integrally bonded thereto to produce a unitary structure, said thermoplastic material extending outwardly beyond each of said glass panels and having a thickened portion substantially enclosing the edges of the glass panels to produce a stepped relation between the thickened portion enclosing the edge of the second mentioned panel and the thickened portion enclosing the edges of the first mentioned panel, electrodes along opposite margins of the surface of the second mentioned panel facing the thermoplastic material, a coating of electrically conducting material also on said surface and in contact with said electrodes, a layer of dielectric tape covering the electrodes and margins of the said panel and extending over onto the adjoining edges thereof, a layer of dielectric tape covering the margins of the first mentioned glass panel and extending over onto the adjoining edges thereof, the last mentioned layer of tape separating the margins and adjoining edges of said first mentioned panel from the thickened portion of the thermoplastic material outwardly of the integral bond between said material and the glass panels within the area of surface of the second mentioned panel.

12. An electrically conducting laminated safety glass structure comprising two glass panels, one of said panels being of smaller surface area than the other of said panels, an interlayer of nonbrittle thermoplastic material interposed between the glass panels and integrally bonded in interfacial relation to produce a unitary structure, said thermoplastic material extending outwardly beyond each of said glass panels and having portions lying outside of the area between said glass sheets and having at least one surface thereof bonded to one of the glass panels and substantially enclosing the edges of said panels, said portions of the thermoplastic material effecting a stepped formation at the enclosed edges of each of the panels, electrodes along opposite margins of the surface of the first mentioned panel in interfacial bond with the thermoplastic material, a coating of electrically conducting material also on said surface and in contact with said electrodes, a layer of dielectric tape covering the electrodes and margins of the first mentioned panel and extending over onto the adjoining edges thereof, a layer of dielectric tape covering the margins of the second mentioned glass panel and extending over onto the adjoining edges whereby said stepped portions of the thermoplastic material lying outside of the area between said glass sheets will be separated from the said glass panels outwardly of the integral interfacial bond produced between said material and said panels.

13. An electrically conducting laminated safety glass structure comprising three or more panels of glass with the outer panels being smaller in each dimension than the overall dimension of the structure and composed of a lower sheet of glass and an upper sheet of glass and an inner panel being substantially equal in size to the overall dimensions of the said structure, interlayers of non-brittle thermoplastic material interposed between the outer and the inner panels and integrally bonded thereto to produce a unitary structure, electrodes along opposite margins of the surfaces of the lower sheets of the outer panels facing the respective layers of thermoplastic material, coatings of electrically conducting material also on said surfaces and in contact with said electrodes, layers of dielectric tape covering the electrodes and extending over onto the adjoining edges of each of the said lower glass sheets, layers of dielectric tape covering the bottom edges of said lower sheets, a layer of dielectric tape covering the top edge of the upper sheet of each of the said outer panels, the thermoplastic material extending outwardly beyond each of said outer glass panels to the full dimension of the safety glass structure and substantially enclosing the edges of the outer panels and extending over the margins of said inner panels, and a layer of dielectric tape covering the margins of each surface of said inner glass panel that extends beyond the outer panels.

14. In an electrically conducting laminated safety glass structure which is made up of a plurality of glass panels and interlayers of thermoplastic material interposed between the glass panels and integrally bonded thereto in interfacial relation to produce a unitary structure, an outer panel on one side of said structure smaller in dimension than the overall dimensions of said structure, said panel being composed of sheets arranged in vertical relation, a second glass panel of equal width but shorter than the dimensions of the structure, a third glass panel equal in width to said structure and relatively longer than the second mentioned glass panel, a fourth glass panel equal in width to said structure and shorter than the third mentioned panel, a fifth glass panel materially smaller in each dimension than the fourth mentioned panel, a sixth glass panel on the opposite side of the safety glass structure of a size substantially equal to the fifth mentioned panel, said sixth panel being composed of sheets arranged in vertical relation, thermoplastic material interposed between each of said glass panels and extending outwardly beyond all of the edges of the first and fifth and sixth mentioned panels to the dimensional size of the said structure to produce thickened portions substantially enclosing the edges of said first fifth and sixth panels and the margins of the second and fourth mentioned panels, said thickened portion further enclosing one edge of the second, third and fourth mentioned panels, electrodes along opposite margins of the surface of the lower sheets of said first and sixth mentioned panels facing the related layer of thermoplastic material, a coating of electrically conducting material on said facing surface of said lower sheets and in contact with said electrodes, a layer of dielectric tape covering each of the said electrodes and extending over onto the adjoining edges of said lower sheets, a layer of dielectric tape covering the bottom edge of the lower sheets, a layer of dielectric tape covering the top edge of the upper sheets of said first and sixth mentioned glass panels, a layer of dielectric tape covering the side and top margins of the surface of the second mentioned panel facing said first mentioned panel and extending inwardly to a point approximating the interfacial bond between the thermoplastic material and the first and second mentioned panels, a layer of dielectric tape covering the bottom edge of said second mentioned panel, a layer of dielectric tape covering the bottom edge of the third mentioned glass panel and extending over onto the margin of one surface of the said panel to a point approximating the interfacial bond between the thermoplastic material and the second and third mentioned glass panels and onto the margin of the other surface of said third mentioned panel to a point approximating the interfacial bond between said third and fourth mentioned glass panels, a layer of dielectric tape covering the margin of the surface of the fourth mentioned panel facing the adjoining fifth mentioned panel and extending over onto the bottom edge of said panel, said tape layer extending inwardly on the margins of said surface to a point approximating the interfacial bond between the thermoplastic material and the fourth and fifth mentioned panels, and a layer of dielectric tape covering the peripheral edge of the fifth mentioned glass panel, whereby the margins and edges of the glass panels will be separated from the thickened portions of the thermoplastic material extending outwardly beyond the interfacial bond created between said thermoplastic material and each of the said glass panels.

ROMEY A. GAISER.
JAMES H. BOICEY.

References Cited in the file of this patent

UNITED STATES PATENTS

| Number | Name | Date |
|---|---|---|
| 2,282,441 | Whitlock | May 12, 1942 |
| 2,490,433 | Gunning et al. | Dec. 6, 1949 |
| 2,507,036 | McCrumm et al. | May 9, 1950 |
| 2,513,993 | Burton | July 4, 1950 |